Oct. 4, 1966

H. S. KERR ET AL 3,277,300

INFRARED PERSONAL RADIATION WARNING DEVICE HAVING
A CANTILEVER SPRING MEMBER FOR
SUPPORTING A SHUTTER

Filed May 31, 1963

*Inventors*
HOWARD S. KERR
JOHN B. DRIFFIELD
IAN HENRY ROWE
by: *Cavanagh & Norman*

United States Patent Office 3,277,300
Patented Oct. 4, 1966

3,277,300
INFRARED PERSONAL RADIATION WARNING DEVICE HAVING A CANTILEVER SPRING MEMBER FOR SUPPORTING A SHUTTER
Howard S. Kerr, Scarborough, Ontario, John B. Driffield, Toronto, Ontario, and Ian Henry Rowe, Willowdale, Ontario, Canada, assignors to The De Havilland Aircraft of Canada, Limited, Ontario, Canada
Filed May 31, 1963, Ser. No. 286,883
2 Claims. (Cl. 250—83.3)

This invention relates to a personal radiation warning device for ray energy in the infrared spectrum.

Attempts have been made to provide a ray energy detector and warning device adapted to be carried by the person. The detector employed is of a kind which when energized by ray energy striking the sensitive elements thereof, generates a direct current signal responsive to the intensity of the radiation. The amplification of the signal from the detector may be accomplished by direct current amplifiers. It is known that direct current amplifiers are generally of unwieldy construction in size and weight as compared to alternating current amplifiers and that direct current amplifiers are subject to performance variation due to drift and operating variables of components.

It is the main object of this invention to provide in combination with a ray energy detector an alternating current amplifier for the detector signal and means interposed between the detector and the alternating current amplifier for converting to a series of pulses by a chopping action thus to achieve a combination of structure adapted for miniaturization and stable performance.

It is a further object of this invention to provide a ray energy chopping device in combination with a detector whereby the energy is detected as a plurality of similar pulses, the amplitude of said pulses being proportional to the intensity of radiation.

From the foregoing and other objects in view the invention generally comprises a ray energy detector adapted to convert ray energy to an electrical signal responsive in amplitude to the intensity of radiation; a base supporting said detector and mountable on a body characterized by inherent vibration and motion such as a person: a grating adapted to provide a multiple shutter effect in conjunction with said detector upon motion relative to the latter: and a spring arm extending from rigid connection to said base and having a free end thereof fixed to said grating and serving as a sole support for the latter to locate said grating in the path of ray energy striking said detector, said spring arm and grating thereon being adapted to vibrate substantially at the natural frequency thereof effecting traverse of said grating over the path of ray energy incident on said detector effectively chopping said ray energy into pulses of energy thus to convert the output signal of said detector to a series of pulses the amplitude of which is substantially proportional to the intensity of said ray energy.

Other objects of the invention will be apparent from a study of the accompanying specification taken in conjunction with the accompanying drawings.

Figure 1:
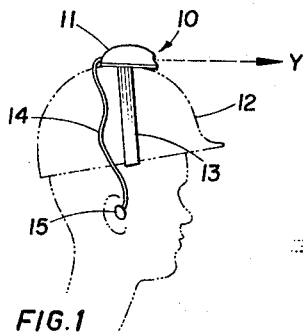
FIGURE 1 is an illustration of a head piece adapted to be worn on the person and embodying the radiation detector of the invention.

Referring to the drawings, the ray energy warning device of the invention is indicated generally by the numeral 10 in FIGURE 1 in which the housing 11 thereof may be strapped to a helmet and/or held thereon by chin strap 13 on the head of the wearer. An ear phone lead line 14 extends with an ear plug 15 to the ear of the wearer. As indicated by the arrow Y the device looks forwardly of the wearer so that upon detection of ray energy in excess of a certain threshold level a noise will sound in the ear phone thereby warning the user.

Figure 2:
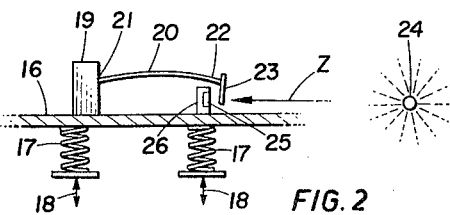
FIGURE 2 is a diagrammatic illustration of the detector system of the invention in its mechanical arrangement by virtue of which ray energy is chopped prior to detection thereof.

In FIGURE 2 a diagrammatic illustration of the fundamental mechanical elements reveals a base 16 on resilient supports 17 subject to inherent vibratory motion indicated by arrows 18, the system 17, 18 being inherent in motion of the humand body even though one may attempt to hold the human body as stationary as possible. Accordingly, the base 16 is to be regarded as subject to inherent vibrations which cannot be eliminated and which will ever be present in the smallest amplitude. Base 16 rigidly supports an abutment 19 from which projects the cantilever spring arm 20 rigidly connected thereto as at 21 and having a free end 22 upon which is rigidly fixed a shutter member 23 located thereby in the path of ray energy proceeding in the path Z from source 24 to the window 25 of the ray energy detector 26. The ray energy detector utilized herein is fastened to base 16 to dispose the window thereof in the path of ray energy from source 24.

The effective size or aperture of the detector window or aperture 25 of detector 26, that is to say the effective size of the area of ray energy striking the sensitive area of the detector device should not be substantially greater than a small number of shutter members or grid spaces. Assuming only one grid space, that is one opening, the chopping effect is too severe and somewhat erratic. On the other hand when the number of grid spaces is a maximum the chopping effect will be a minimum. For most purposes a range between about three grid openings and ten grid openings on an effective diameter has been found to be satisfactory.

In specific consideration the shutter member 23 comprises an opaque surface 27 on a small rectangular sheet of glass or other substance transparent or suitably translucent to ray energy and having thereon a series of parallel spaced apart grid openings 28 in said surface of a width of approximately .05 inch and at a corresponding spacing. The mass of said member being compatible with the natural frequency of vibration of said member and resilient wire parallel spaced apart cantilever supports 29 therefor extending from mounting holes 30 in abutment 31 whereby minimum damping of free vibration is accomplished. This is more easily accomplished with any one shutter design by proportioning the wire size of the members 29 and the spacing therebetween relative to the torsional rigidity of the members as will be apparent to those skilled in the arts of physics. The specific form of the cantilever spring member is not important since it may take the form of a simple linearly tapered fixed spring or curved spring member variously shaped according to specific requirements having regard to air characteristics affecting air resistance damping. Preferably the use of wire elements to constitute a cantilever member is preferred to minimize air resistance damping.

Figure 3:
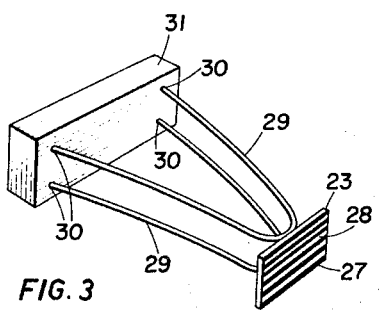
FIGURE 3 is a perspective view of one preferred mechanical form of chopping device.

The structure indicated in FIGURES 2 and 3 effects a chopping action incident on the ray energy detector 26 and this portion of the structure may be referred to hereafter as a "nodding chopper" for purposes of identifying same in relation to its function.

Figure 4:
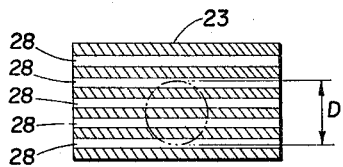
FIGURE 4 is a diagrammatic illustration of the effective size of the shutter element of FIGURES 2 and 3 relative to the effective aperture D of the detector.
Figure 5:
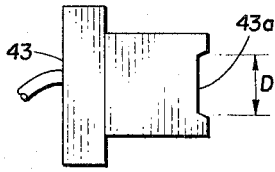
FIGURE 5 is a side elevation of a preferred form of detector device illustrating the effective diameter of the aperture thereof.
Figure 6:
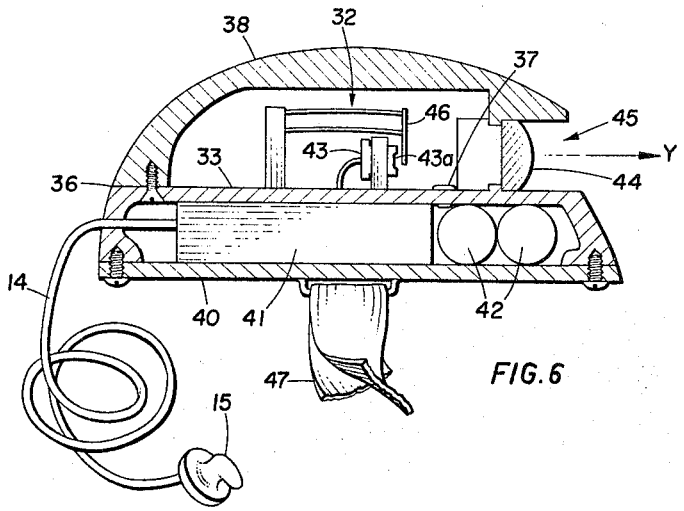
FIGURE 6 is a sectional view of a preferred form of portable ray energy detector according to the invention.
Figure 7:
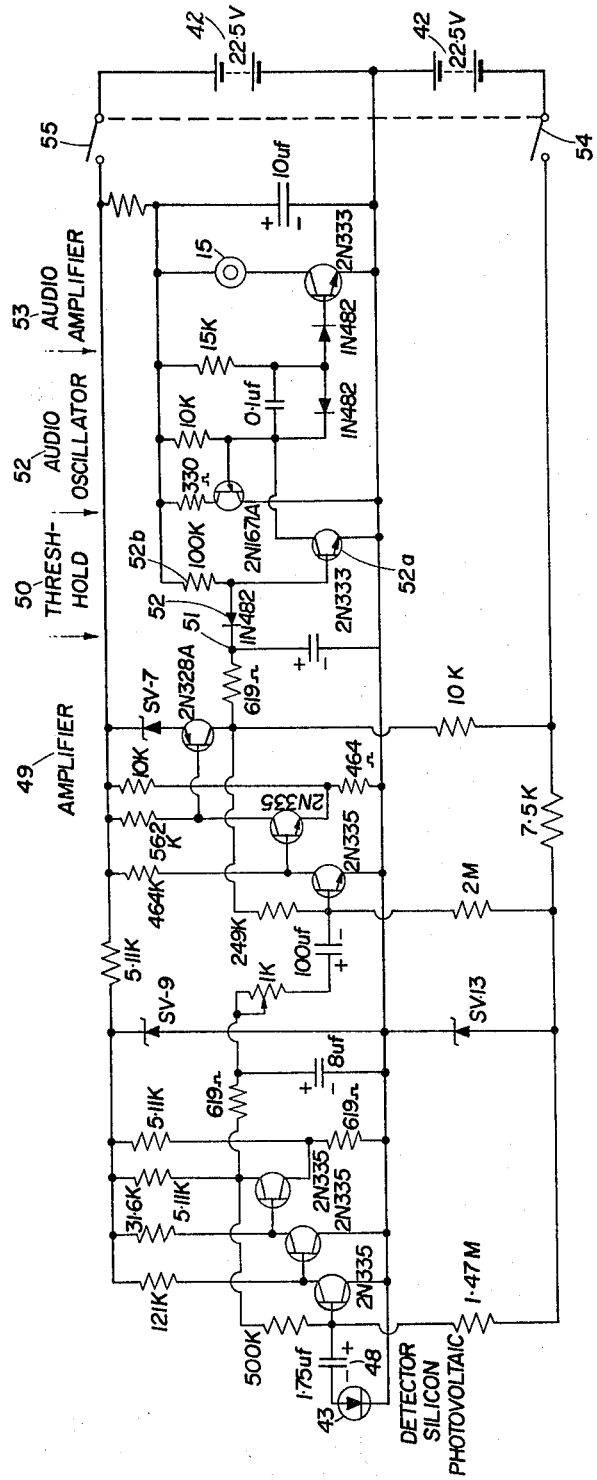
FIGURE 7 is an electronic schematic of a suitable detector amplifier circuit adapted for miniaturization and incorporation as a part of the device of the invention.

In one preferred complete form structures are organized in the manner illustrated in FIGURES 4, 5 and 6 wherein the nodding chopper of the invention generally indicated by numeral 32 is supported on the base 33 having side walls 34, 35 adapted to be fastened by flanges 36, 37 to a housing 38, the latter having depending side walls 39 connecting to a base 40. Base 33 mounts electronic amplifier 41 associated with battery power supply 42 and the radiation detector 43 having aperture 43a looking in the direction of arrow Y through the wide angle lens 44 having substantially 120° of lateral field of view and set in the opening 45 of housing 38 such that the shutter element 46 of the nodding chopper 32 is disposed in the path of radiation coming from lens 45 and incident on the detector 43. Other forms of lens may be utilized depending upon the field of view desired for the detector. Attached to the base 40 and/or on housing 38 is the strap 47 by means of which the user fastens the device of the invention to his helmet or utilizes same as a chin strap. Other means may be provided for fastening the device of the invention to the wearer's head or protecting devices or apparel for the head.

One suitable form of electronic circuit adapted for miniaturization into the component designated as the amplifier 41 of FIGURE 6 is revealed in schematic form in FIGURE 5 wherein the radiation detector 43 is shown in the form of a silicon photovoltaic of known form. The signal generated thereby responsive to the pulses of ray energy incident thereon is coupled through condenser 48 of a pulse signal amplifier section 49 of relatively broad frequency range audio amplification. At threshold control stage 50 the signal 51 being rectified by the diode 52 triggers the normally quenched relaxation type saw tooth wave audio oscillator 52 by blocking the current path through silicon amplifier 52a with incoming signal, the amplifier 52a in conjunction with resistor 52b serving normally to quench the audio oscillator to a predetermined level determined by resistor 52b whereby incoming signal overcoming such level or signal bias effects operation of oscillator 52. The signal frequency generated by the audio oscillator is set at a tone compatible with that useful as a warning signal the same being communicated through the final audio amplifier stage 53 to energize the ear phone 15. Batteries 42 are shown in conjunction with ganged switches 54, 55.

It is intended that the present disclosure should not be construed in any limiting sense other than that indicated by the scope of the following claims having regard to the state of the prior art.

What we claim is:

1. A personal radiation warning device for ray energy comprising: a ray energy detector adapted to convert ray energy to an electrical signal responsive in amplitude to the intensity of radiation; a base supporting said detector and mountable on a body characterized by inherent vibration and motion such as a person; a grating adapted to provide a multiple shutter in conjunction with said detector upon motion relative to the latter; a spring arm extending from rigid connection to said base and having a free end thereof fixed to said grating and serving as a sole support for the latter to locate said grating in the path of ray energy striking said detector, said spring arm and grating thereon being adapted to vibrate substantially at the natural frequency thereof effecting traverse of said grating over the path of ray energy incident on said detector effectively chopping said ray energy into pulses of energy thus to convert the output signal of said detector to a series of pulses the amplitude of which is substantially proportional to the intensity of said ray energy; a housing extending about said base detector, grating and spring arm; a window in said housing adapted for the passage of ray energy therethrough; means supporting said base in said housing to locate said grating and detector in the path of ray energy entering said housing through said window; means responsive to said series of pulses for generating a warning signal; and means effectively biasing said pulse responsive means to a predetermined thereshold corresponding to a predetermined intensity of ray energy.

2. A personal radiation warning device for ray energy comprising: a ray energy detector adapted to convert ray energy to an electrical signal responsive in amplitude to the intensity of radiation; a base supporting said detector and mountable on a body characterized by inherent vibration and motion such as a person; a grating adapted to provide a multiple shutter effect in conjunction with said detector upon motion relative to the latter; a spring arm extending from rigid connection to said base and having a free end thereof fixed to said grating and serving as a sole support for the latter to locate said grating in the path of ray energy striking said detector, said spring arm and grating thereon being adapted to vibrate substantially at the natural frequency thereof effecting traverse of said grating over the path of ray energy incident on said detector effectively chopping said ray energy into pulses of energy thus to convert the output signal of said detector to a series of pulses the amplitude of which is substantially proportional to the intensity of said ray energy; a housing extending about said base detector, grating and spring arm; a window in said housing adapted for the passage of ray energy therethrough; means supporting said base in said housing to locate said grating and detector in the path of ray energy entering said housing through said window; means responsive to said series of pulses for generating a warning signal; means effectively biasing said pulse responsive means to a predetermined threshold corresponding to a predetermined intensity of ray energy; and strap means for fastening said housing to the head of a person.

References Cited by the Examiner

UNITED STATES PATENTS

| 235,199 | 12/1880 | Bell | 88—61 |
| 2,481,083 | 9/1949 | Chew | 88—61 |
| 2,818,511 | 12/1957 | Ullery et al. | 250—211 |
| 2,967,940 | 1/1961 | Erb et al. | 250—83.3 |
| 2,976,419 | 3/1961 | Menke et al. | 340—238 X |

RALPH G. NILSON, *Primary Examiner.*

MAYNARD R. WILBUR, *Examiner.*

S. ELBAUM, *Assistant Examiner.*